United States Patent [19]

Akiyama

[11] Patent Number: 4,743,991
[45] Date of Patent: May 10, 1988

[54] LID APPARATUS FOR DISK INSERTION OPENING OF DISK PLAYER

[75] Inventor: Tsuneo Akiyama, Yokohama, Japan
[73] Assignee: Shintom Kabushiki Kaisha, Kanagawa, Japan
[21] Appl. No.: 3,071
[22] Filed: Jan. 14, 1987
[30] Foreign Application Priority Data Jan. 14, 1986 [JP] Japan .................................. 61-4254

[51] Int. Cl.⁴ ...................... G11B 17/04; G11B 33/02
[52] U.S. Cl. ..................................... 360/97; 369/77.2
[58] Field of Search .................... 360/97, 99; 206/444; 70/159; 369/77.1, 77.2

[56] References Cited

U.S. PATENT DOCUMENTS 4,691,257 9/1987 Taguchi ............................... 360/99

Primary Examiner—Robert S. Tupper
Attorney, Agent, or Firm—Bruce L. Adams; Van C. Wilks

[57] ABSTRACT

A disk player that will receive removably a record jacket having a disk therein. The disk player is provided with a housing including a front panel with an insertion opening for said jacket, and a lid member adapted to said insertion opening. Said lid member is pivotally supported so that said lid member can be moved between the close position that prevents said jacket from being passed through said insertion opening and the open position that allows said jacket to be passed through said insertion opening, and is normally energized to be in said close position. A control member is provided that is supported movably between a lock position where said lid member is restrained in said close position and a release position where free movement of said lid member is secured. Said control member has a stopper member engageable with said lid member in said lock position and a cam follower section engageable with a corner section of said jacket when said jacket is going to be inserted into said insertion opening. The corner section of said jacket acts as a cam for said cam follower section and when said cam follower section is moved by said cam upon insertion of said jacket, said stopper section together with said cam follower is retracted to said release position.

5 Claims, 2 Drawing Sheets

LID APPARATUS FOR DISK INSERTION OPENING OF DISK PLAYER

FIELD OF THE INVENTION

The present invention relates to front loading type disk players, and particularly to a lid apparatus for opening/closing a disk insertion opening through which a disk in a jacket is received into a disk player.

In an apparatus that receives regenerative signals from a disk carrying information in the form of a binary code that can be optically read such as video disk players (VD) and audio compact disk players (CD), several types of regenerative modes are known; a type wherein a disk assembly placed in a transparent jacket is received, and the information from the disk rotated in the jacket is read through the transparent jacket, a type wherein only a disk is received and the information is read from the disk directly, and a type wherein a disk is taken out in a player automatically from the jacket inserted into the player and regeneration is carried out. In the player of the last-mentioned type, the jacket is not necessarily transparent, and when the disk is taken out from the jacket, the jacket may be removed from the player. In any disk player of these types, front loading is common. In a disk player of a type where an opaque or transparent record jacket having a disk therein is to be inserted into the player, the player has, in the front panel of the player, a relatively large insertion opening capable of receiving the jacket, there is a risk that things other than the disk in the jacket having a predetermined size will be inserted into the insertion opening, and in most cases an unjacketed disk is inadvertently inserted, causing damage to the record surface of the unjacketed disk, or causing the unjacketed disk to be unremovable from the player, which makes the player out of order.

DESCRIPTION OF THE PRIOR ART

To obviate that things other than a predetermined disk in a jacket may be prevented from being inserted into a disk insertion opening, it has been suggested that a lid is provided to the insertion opening.

In Japanese Patent Application Laid-Open No. 60-55547, issued on Mar. 30, 1985, a player has been suggested that is constituted such that the player is provided with a first lid and a second lid, the first lid is opened or closed by power of a driving mechanism such as an electric motor, and when the first lid is opened, the second lid is pushed by a jacket inserted through the position of the first lid and is opened. Prior to the insertion of the disk in a jacket, because it is required that the operating switch of the driving mechanism for opening the first lid is turned on, the insertion is apparently troublesome. Further, after the first lid is opened, since the second lid is opened when it is simply pushed, this suggestion does not solve the subject for allowing a predetermined jacket to be passed.

SUMMARY OF THE INVENTION

The object of the invention is to provide a disk player having a disk insertion opening with a lid member that acts as a gate for allowing only a disk in a jacket having a predetermined size to be passed.

Particularly, according to the present invention, a disk player is provided wherein a jacket itself acts as a key to a lid member of a disk insertion opening so that if a record jacket to be inserted into the disk insertion opening has a predetermined size, a lock of the lid member that closes the insertion opening is released, and the lid member is opened upon insertion of the jacket, while if a record jacket different in size from a predetermined size or an unjacketed disk is to be inserted, the lid member that is closed will not be released so that insertion of the record jacket different in size from a predetermined size or an unjacketed disk may be prevented.

According to the present invention, there is provided a disk player that will receive removably a record jacket having a disk therein, characterised in that the disk player is provided with a housing including a front panel with an insertion opening for said jacket, a lid member adapted to said insertion opening, said lid member being pivotally supported so that said lid member can be moved between the close position that prevents said jacket from being passed through said insertion opening and the open position that allows said jacket to be passed through said insertion opening, and being normally energized to be in said close position, and a control member supported movably between a lock position where said lid member is restrained in said close position and a release position where free movement of said lid member is secured, said control member having a stopper member engageable with said lid member in said lock position and a cam follower section engageable with a corner section of said jacket when said jacket is going to be inserted into said insertion opening, the corner section of said jacket acts as a cam for said cam follower section and when said cam follower section is moved by said cam upon insertion of said jacket, said stopper section together with said cam follower is retracted to said release position.

DETAILED DESCRIPTION OF THE ILLUSTRATED EMBODIMENT

Figure 1:
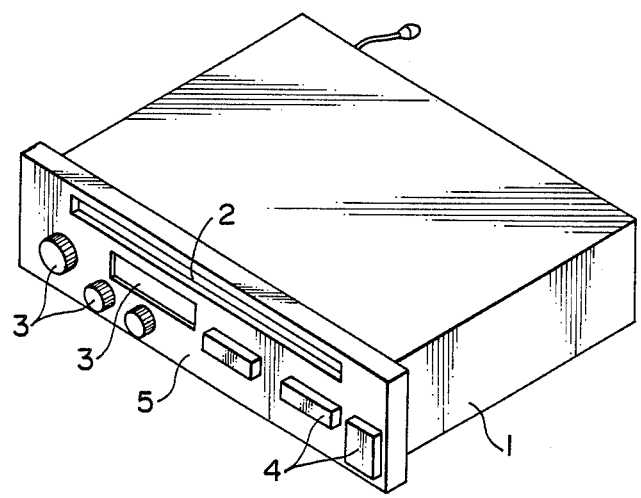
FIG. 1 is a perspective view of a disk player having a front panel with a disk insertion opening.

Referring to FIG. 1, a housing 1 including a front panel 5 with an elongate disk insertion opening 2 for receiving a disk in a jacket that is known is illustrated. The front panel 5 is provided with several operating dials 3 and indicators or displays 4, which are well known and are not the subject matter of the present invention.

Figure 2:
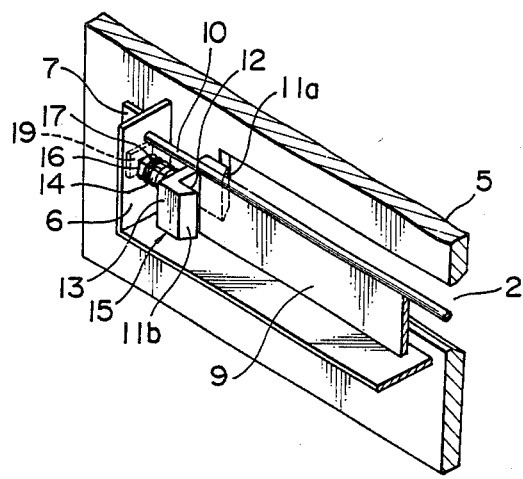
FIG. 2 is a perspective view of the back section of the front panel shown in FIG. 1.
Figure 3:
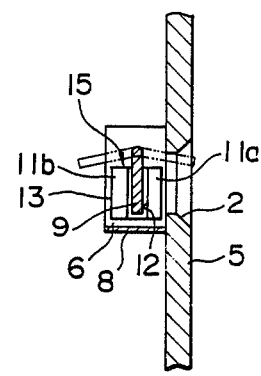
FIG. 3 is a side view of the same section as shown in FIG. 2 but seen from a different angle.
Figure 4:
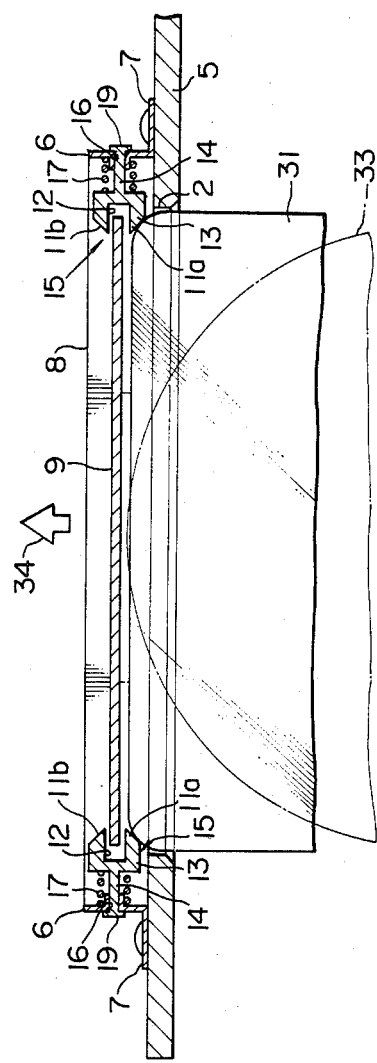
FIGS. 4 and 5 are cross-sectional views of the disk insertion opening with a disk in a jacket being just before insertion in FIG. 4, and with the disk in a jacket being inserted into the disk insertion opening in FIG. 5.
Figure 5:
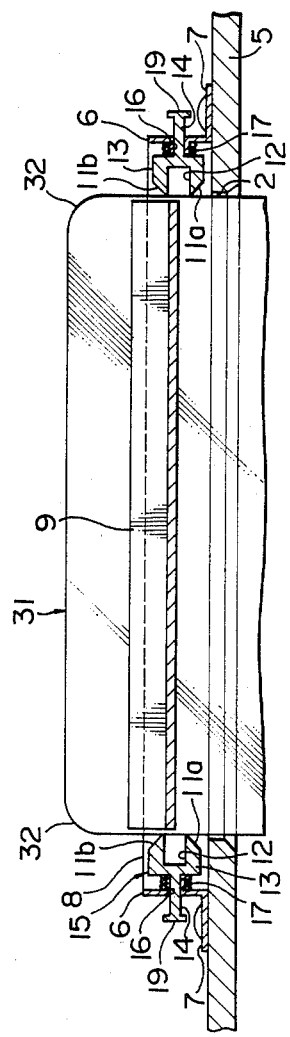

FIG. 2 illustrates the state of the back of the front panel 5, that is, the state of part of the inside of the front panel 5 seen from the inside of the housing 1 and corresponds to one side of the whole arrangement shown in FIGS. 4 and 5.

A lid member 9 in the shape of a horizontally elongate plate adapted to the disk insertion opening 2 is situated inside the disk insertion opening 2. On the back of the front panel 5, a bracket generally designated 8 is fixed, and the lid member 9 is attached to a shaft 10 rotatably supported by the bracket 8. The bracket 8 is extended horizontally along the lower section of the disk insertion opening 2 and the opposite ends of the bracket 8 are formed with support plate sections 6 and attaching flange sections 7. The attaching flange sections 7 are screwed firmly to the back surface of the front panel 5, and the support plate sections 6 are bent at right angles from the attaching flange sections 7 adjacent thereto and are opposed to each other to extend vertically.

The opposed support plate sections 6 support pivotally the lid member 9 via the shaft 10 mentioned above and also support control members 15 for controlling movement of the lid member 9. Although, according to the illustrated embodiment, the control members 15 are situated on the opposite sides of the lid member 9 respectively, which control members 15 may have the same constitution, in some cases it is possible to provide only one control member. Normally, the lid member 9 is provided with a spring (not shown) in known manner for energizing the lid member 9 to a position where the disk insertion opening 2 is closed. Each control member 15 includes a pair of fingers 13 defining a slot 12 engageable with the side edge of the lid member 9 in the close position, is operably supported by a rod 14 engaged with the support plate section 6, and is normally engergized to a position, where the slot 12 defined by the pair of fingers 13 is engaged with the side edge of the lid member 9, by the force of a spring 17 arranged around the rod 14 between the support plate section 6 and the control member 15. The rod 14 supporting the control member 15 has a noncircular cross section, is engaged with a bearing hole 16 that is formed in the support plate section 6 and is in conformity with the crosssectional shape of the rod 14, and is prevented by its head 19 from coming off from the support plate section 6. As a result, although the control member 15 can be slid longitudinally of the rod 14, the rod 14 is supported in an unrotational state. The ends of the fingers 13 are formed into slants 11a and 11b respectively, and the end of the slant 11a of one finger located on the side of the disk insertion opening 2 is normally positioned to extend inwardly a little toward the insertion opening 2. The slants 11a, 11b are oriented to act as cam followers for giving the control member 15 a component of force so that the control member 15 may be retracted against the reaction force of the spring 17 when the slants 11a, 11b receive a force normal to the axis of the rod 14 in the imaginary plane passing through the axis of the rod 14.

Referring to FIG. 5 together with FIG. 4, although not restrictive, the present invention is suitable for a disk player of a type where use is made of a media having a disk 33 in a transparent record jacket 31. In this type of a player, the disk 33 held in the record jacket 31 is inserted into the player with the disk 33 in the jacket 31, then only the disk 33 is rotated with this state kept, and information is regenerated from the disk 33 through the transparent jacket 31. In this case, according to the invention, prior to the regeneration, if the predetermined jacket 31 having the disk therein is going to be inserted into the disk insertion opening 2 in the direction shown by an arrow 34, each corner section 32 of the jacket 31 engages with each slant 11a formed on one finger 13 of the control members 15 extended inwardly a little into the disk insertion opening 2, and when the jacket 31 is further moved into the player, a component of the pressing force is applied on the control member 15, and the control member 15 is retracted in the axial direction of the rod 14 against the reaction force of the spring 17. As a result, the lock to the lid member 9 by each pair of fingers 13 defining the slot 12 is released, and the lid member 9 is forcibly opened by the jacket 31 thereby allowing the jacket 31 to be passed through. When the jacket 31 having the disk therein is inserted completely into the player, the lid member 9 is returned to the normal position due to the closing inclination as described above, and the control member 15 is returned to the normal position where the lid member 9 is locked by the reaction force of the spring 17. Then a performance is carried out in known manner, and after the completion of the performance, the jacket 31 having the disk therein is moved toward the outlet by action of a known injector in such a manner that corner sections of the jacket 31 located opposite to the corner sections mentioned above are engaged with the slants 11b formed on other fingers 13 of the control member 15, the lock to the lid member 9 by the control member 15 is released in a similar way to that case of the insertion of the jacket described above, and the lid member 9 is opened toward the insertion opening 2 thereby allowing the jacket 31 to be removed.

If a jacket having a size different from the predetermined size or a disk without a jacket is going to be inserted into the disk insertion opening 2, the engagement thereof with the slants 11a of the fingers 13 of the control members 15 extending a little into the insertion opening 2 would not take place, so that the lock to the lid member 9 by the control members 15 is not released and therefore the lid member 9 prevents other jackets or unjacketed disks other than the jacket 31 having a predetermined size from being inserted.

While a preferred embodiment of the present invention has been described, it should be understood that the embodiment is intended to be illustrate only and changes and modifications may be made. In particular, although, in the embodiment, for lock means or stopper means comprising a pair of fingers for restraining the lid member, the finger themselves have slants that act as cam followers for actuating the lock means or stopper means, other fingers having slants similar to those slants can be provided.

What is claimed is:

1. A disk player that will receive removably a record jacket having a disk therein, characterised in that the disk player is provided with a housing including a front panel with an insertion opening for said jacket, a lid member adapted to said insertion opening, said lid member being pivotally supported so that said lid member can be moved between the close position that prevents said jacket from being passed through said insertion opening and the open position that allows said jacket to be passed through said insertion opening, and being normally energized to be in said close position, and a control member supported movably between a lock position where said lid member is restrained in said close position and a release position where free movement of said lid member is secured, said control member having a stopper member engageable with said lid member in said lock position and a cam follower section engageable with a corner section of said jacket, the corner section of said jacket acts as a cam for said cam follower section and when said cam follower section is moved by said cam upon insertion of said jacket, said stopper section together with said cam follower is retracted to said release position.

2. A disk player as claimed in claim 1, characterised in that the disk player is further provided with support means for supporting operably said control member, said control member includes a connecting section to be connected operably to said support means so that said control member is supported by said connecting section slidably but unrotatively relative to said support means, said stopper section includes a pair of fingers forming a slot engageable with said lid member, said cam follower section is defined by a slant formed on said control member, and when said jacket is moved toward the inside of said insertion opening, a corner section of said jacket acts as a cam to allow said slant to move accordingly thereby moving said control member, and said lid member is released from said slot between said fingers.

3. A disk player as claimed in claim 2, said connecting section of said control member comprising a shaft having a noncircular crosssectional shape and said support means including a bearing for supporting said shaft slidably but unrotatively.

4. A disk player as claimed in claim 2, said slant defining said cam follower section being formed on each of said fingers.

5. A disk player as claimed in claim 1, said lid member being supported pivotally around a horizontal axis extending along the length of said disk insertion opening, and said control member being provided in a position where said control member can engage with at least one of the shorter side edges of said lid member.

* * * * *